(12) United States Patent
Hooker

(10) Patent No.: US 7,491,026 B2
(45) Date of Patent: Feb. 17, 2009

(54) LIFT GATE ASSEMBLY

(75) Inventor: William J. Hooker, Woodstock (CA)

(73) Assignee: SAF-Holland, Inc., Holland, MI (US)

( * ) Notice: Subject to any disclaimer, the term of this patent is extended or adjusted under 35 U.S.C. 154(b) by 561 days.

(21) Appl. No.: 11/082,513

(22) Filed: Mar. 17, 2005

(65) Prior Publication Data

US 2006/0210383 A1 Sep. 21, 2006

(51) Int. Cl.
*B60P 1/44* (2006.01)
(52) U.S. Cl. .................. 414/545; 414/556; 414/557; 187/243
(58) Field of Classification Search .......... 414/545, 414/557, 556; 187/243
See application file for complete search history.

(56) References Cited

U.S. PATENT DOCUMENTS

| | | | | | |
|---|---|---|---|---|---|
| 4,007,844 | A | * | 2/1977 | Perkins | 414/471 |
| RE31,157 | E | * | 2/1983 | Perkins | 414/545 |
| 4,408,948 | A | * | 10/1983 | Robinson | 414/545 |
| 5,122,026 | A | * | 6/1992 | Kent | 414/545 |
| 5,263,808 | A | * | 11/1993 | Kent | 414/545 |
| 5,449,267 | A | * | 9/1995 | Ablabutyan | 414/540 |
| 5,513,943 | A | * | 5/1996 | Lugash et al. | 414/545 |
| 5,597,282 | A | * | 1/1997 | Hoffman et al. | 414/545 |
| 5,683,221 | A | * | 11/1997 | Ablabutyan | 414/540 |

* cited by examiner

*Primary Examiner*—Michael S Lowe
(74) *Attorney, Agent, or Firm*—Price, Heneveld, Cooper, DeWitt & Litton, LLP

(57) ABSTRACT

A lift gate assembly including a pair of spaced-apart columns, a pair of support members telescopingly received within the pair of spaced apart columns, a platform having a first section operably coupled to the pair of support members and a second section operably coupled to the first section, and a support element having a first end operably coupled with one of the pair of support members, and a second end operably coupled with the platform. The lift gate assembly also includes a support arm having a first end operably coupled to the platform and a second end operably coupled to the support element between the first and second ends of the support element, a first bracket fixed to the first section of the platform and positioned to restrict rotation of the platform with respect to at least one of the columns, a second bracket fixed to the second section of the platform and positioned to restrict the rotation of the arm with respect to the second section of the platform, a third bracket fixed to one of the columns, and a fourth bracket operably coupled to the arm and adapted to engage the third bracket to restrict rotation of the platform with respect to the columns and to support the platform from the columns in a vertical direction when the platform is in a storage position.

33 Claims, 3 Drawing Sheets

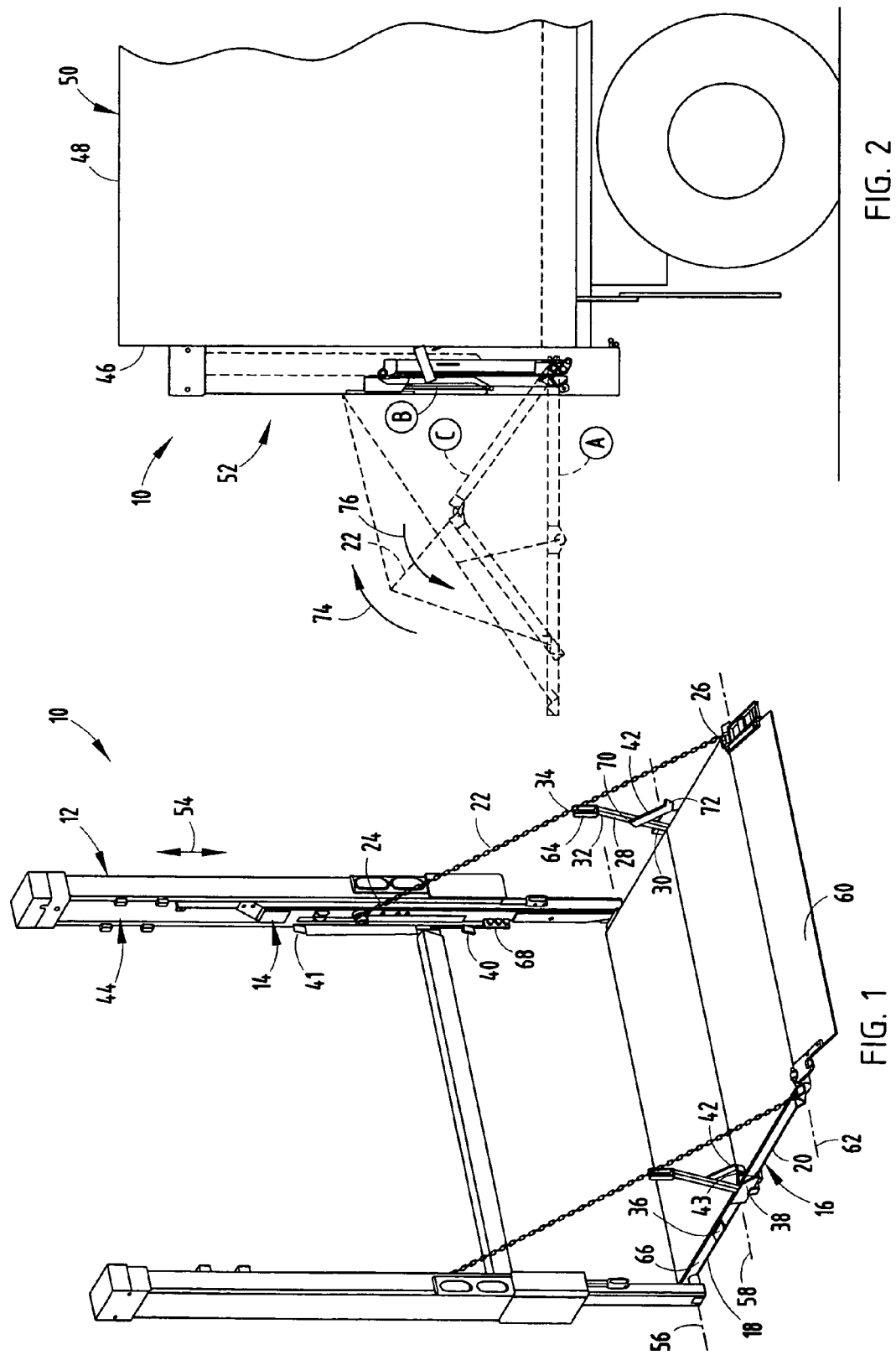

LIFT GATE ASSEMBLY

BACKGROUND OF THE INVENTION

The present invention involves a lift gate assembly utilized for loading and unloading of materials to be shipped, and in particular to a lift gate assembly that vertically supports a platform of the lift gate assembly from the associated vehicle while simultaneously preventing opening of the platform and retaining support members from free motion during operation of the vehicle.

Hydraulic lift gates are used in a wide variety of applications associated with trucks and trailers to facilitate the loading and unloading of cargo when the cargo is required to be vertically lifted from a loading surface, such as the ground or a dock surface, to the height of the vehicle cargo compartment floor, or lowered to the ground or dock surface from the height of the vehicle cargo compartment floor. Previous lift gate designs have performed this function by vertically extending and retracting telescoping columns to which a cargo platform is attached. When used for the loading or unloading of cargo in this manner, the platform is unfolded to a horizontal position, thereby protruding behind the rear of the associated vehicle to provide a surface onto which the cargo can be placed. When in storage, the platform is folded into a vertical position, thereby reducing the distance the platform extends from the rear of the associated vehicle. Several lift gates as known permit the platform to be positioned so as to allow ingress and egress of materials through a door opening of the vehicle, thereby allowing loading and unloading of the vehicle when the platform is in a storage position.

Other known lift gates include platforms that are comprised of at least two sections that are folded one against the other and stored in a vertical position adjacent the rear of the associated vehicle when the vehicle is in transit, or when being docked, and that are in a horizontal position forming one continuous section when the platform is folded and being used to raise or lower cargo.

Heretofore, the platform, whether formed of a single or multiple sections, is rotatably moved between the storage and load/unload positions by a motor operably coupled thereto. The associated motor prevents the platform from being rotated from a storage position to the load/unload position by applying a rotational force thereto. Moreover, it is common practice to provide the lift gate with one or more latch mechanisms to prevent the lift gate from unfolding and/or lowering inadvertently from the storage position. Previous designs of latches required the operator to manually operate the mechanism as attached to the columns or the platform, thereby requiring the operator to position themselves very close to the lift gate chancing injury. Other known designs include utilizing a plurality of mating wedges, wherein a wedge associated with the telescoping columns is coupled with a wedge associated with the platform. In this particular design, a constant upward force is required to be exerted by the telescoping columns, thereby keeping the wedges engaged and preventing the platform from falling from the storage position to the load/unload position.

Other known lift gates utilize chains or other flexible elements having one end connected to one of the column assemblies and another end connected to the platform, such that the chain supports the platform from the column assemblies when in the load/unload position. While the chains provide adequate support for the platform from the column assemblies, these chains are allowed to move freely with respect to the other components of the lift gate and the associated vehicle when the platform is in the storage position, thereby allowing the chains to possibly damage components of the lift gate and the associated vehicle, as well as the aesthetic appearance of the vehicle.

A lift gate assembly is needed that provides adequate retention and support of an associated platform in a raised storage position, allows for storage of the platform at various heights with respect to an associated vehicle door, and that prevents support elements used to support the platform in a lowered in-use position from damaging other components of the lift gate assembly or the aesthetic appearance of the associated vehicle when in a raised storage position.

SUMMARY OF THE INVENTION

One aspect of the present invention is to provide a lift gate assembly that includes a pair of spaced apart columns, a pair of support elements telescopingly received within the pair of spaced apart columns, and a platform having a first section operably coupled to the pair of support members, and a second section operably coupled to the first section. The lift gate assembly also includes a support element having a first end operably coupled with one of the pair of support members, and a second end operably coupled with the platform, wherein the support member supports the platform when the platform is in an in-use position, and an arm having a first end operably coupled to the platform and a second end operably coupled to the support element between the first and second ends of the support element. The lift gate assembly further includes a first bracket fixed to the first section of the platform and positioned to restrict rotation of the platform with respect to at least one of the columns, a second bracket fixed to the second section of the platform and positioned to restrict the rotation of the arm with respect to the second section of the platform, at least one third bracket fixed to one of the columns, and a fourth bracket operably coupled to the arm and adapted to engage the third bracket to restrict rotation of the platform with respect to one of the columns and to support the platform from one of the columns in a vertical direction when the platform is in a storage position.

Another aspect of the present invention is to provide a lift gate assembly that includes a pair of spaced apart columns, a pair of support members telescopingly received within the pair of spaced apart columns, and a platform operably coupled to the pair of support members inoperable between a lowered in-use position and a raised storage position. The lift gate assembly also includes a support element having a first end operably coupled with one of the pair of support members, and a second end operably coupled with the platform, wherein the support element supports the platform when in the in-use position, and an arm having a first end operably coupled to the platform and a second end operably coupled to the support element between the first and second ends of the support element. The lift gate assembly further includes at least one first bracket fixed to one of the columns, and a second bracket operably coupled to the arm and adapted to engage the first bracket to restrict rotation of the platform with respect to one of the columns and to support the platform from one of the columns in a vertical direction when the platform is in the storage position.

A further aspect of the present invention is to provide a lift gate assembly that includes a pair of spaced apart columns, a pair of support members telescopingly received within the pair of spaced apart columns, and a platform operably coupled to the pair of support members and operable between a lowered in-use position and a raised storage position. The lift gate assembly also includes a support element having a first end operably coupled with one of the pair of support members, and a second end operably coupled with the platform, wherein the support element supports the platform when the platform is in the in-use position, and an arm having a first end operably coupled to the platform and a second end operably coupled to the support element between the first and second ends of the support element. The lift gate assembly further includes a first bracket fixed to the platform that restricts the rotation of the arm with respect to the platform and that restricts the movement of at least a portion of the supporting element from between one of the pair of columns and the platform when the platform is in the storage position.

The present inventive lift gate assembly provides support of an associated platform in a raised storage position, allows for storage of the platform at various heights with respect to an associated vehicle doors, and prevents support elements used to support the platform in a lowered in-use position from damaging other components of the lift gate assembly or the aesthetic appearance of the associated vehicle when in a raised storage position. The lift gate assembly is efficient in use and in storage, is safely operable by even unskilled workers, and is particularly well adapted for the intended use.

BRIEF DESCRIPTION OF THE DRAWINGS

FIG. 1 is a top perspective view of the lift gate assembly embodying the present invention, wherein a platform of the lift gate assembly is shown in a lowered in-use position;

FIG. 2 is a side view of the lift gate assembly, wherein the platform is shown in a raised storage position, a semi-retracted position in dashed line, and the lowered in-use position in dashed line;

DETAILED DESCRIPTION OF THE PREFERRED EMBODIMENTS

Figure 3B:
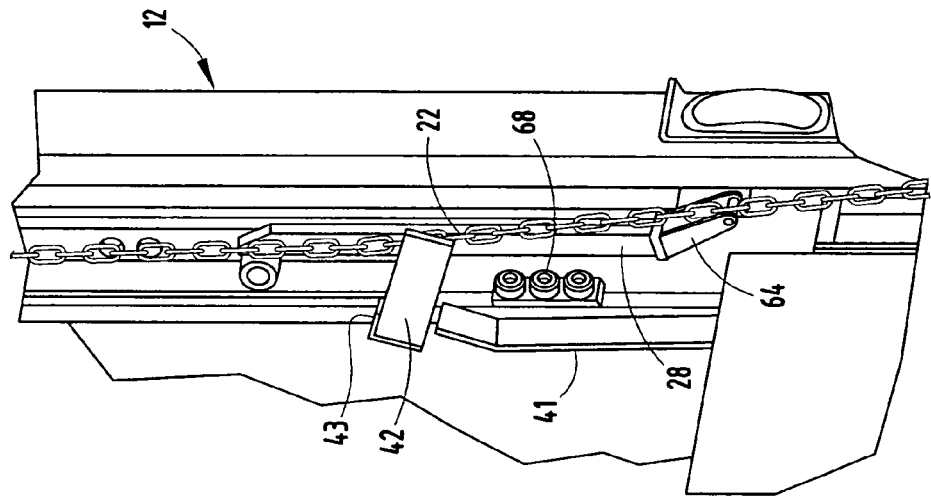
FIG. 3B is an enlarged perspective view of a retention assembly of the lift gate assembly.
Figure 3A:
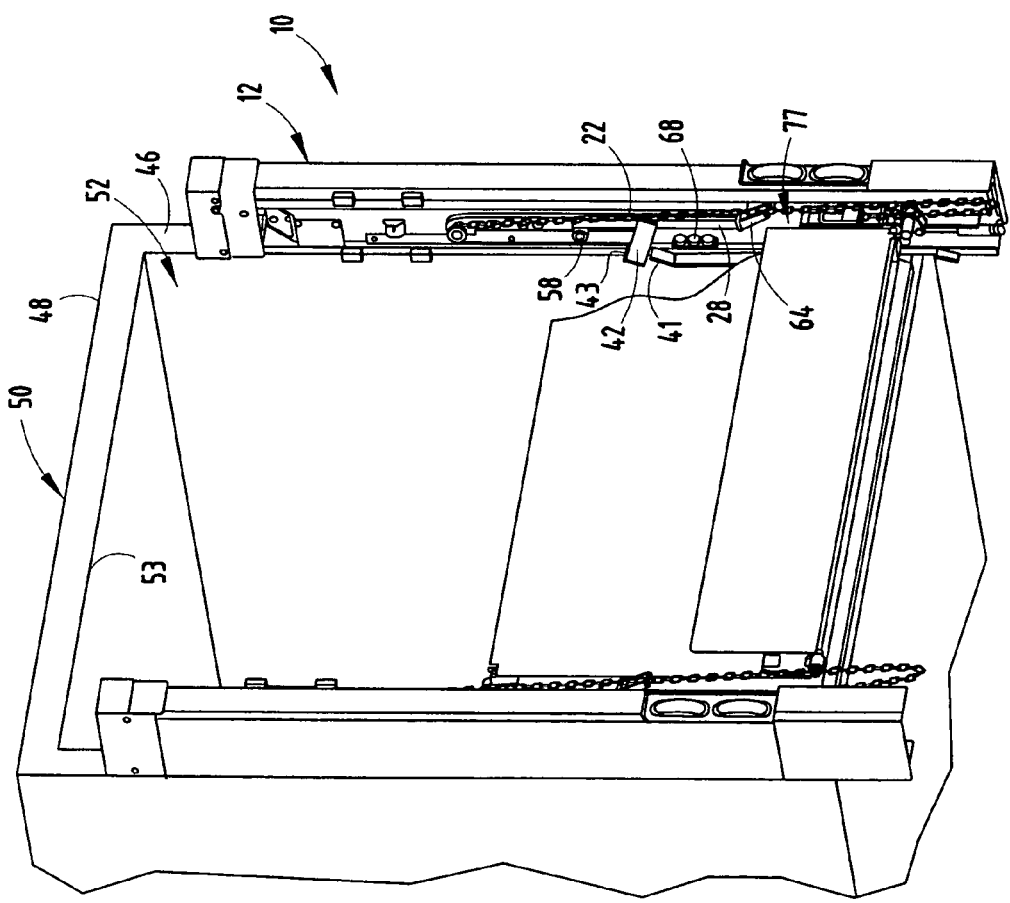
FIG. 3A is a perspective view of the lift gate assembly as coupled to an associated vehicle, and wherein a portion of the platform is cutaway.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

The reference numeral 10 (FIG. 1) generally designates the lift gate assembly embodying the present invention. In the illustrated example, the lift gate assembly 10 includes a pair of spaced apart columns 12 and a pair of support members 14 telescopingly received within the pair of spaced apart columns 12. The lift gate assembly 10 also includes a platform 16 having a first or forward section 18 pivotally coupled to the support members 14 and a second or rearward section 20 pivotally coupled to the first section 18. A pair of support elements 22 each having a first end 24 pivotally coupled with an associated one of the support members 14, and a second end 26 operably coupled with the rearward section 20 of the platform 16, wherein the support elements 22 support the platform 16 when the platform 16 is in a lowered in-use position A (FIG. 2). The lift gate assembly 10 further includes a pair of arms 28 each having a first end 30 operably coupled to the platform 16 and a second end 32 operably coupled to one of the support elements 22 at a point 34 located between the first end 24 and the second end 26 of the support elements 22. The lift gate assembly 10 further includes a pair of first brackets 36 fixed to the forward section 18 of the platform 16 that restricts rotation of the platform 16 with respect to the columns 12, a pair of second brackets 38 fixed to the rearward section 20 of the platform 16 that restrict the rotation of the arm 28 with respect to the rearward section 20 of the platform 16, a pair of third brackets 40 fixed to the columns 12, and a pair of fourth brackets 42 coupled with the arms 28 and that engage the pair of third brackets 40 to restrict rotation of the platform 16 with respect to the columns 12 and to support the platform 16 from the columns 12 in a vertical direction when the platform 16 is in a raised storage position B (FIG. 2). In operation, the platform 16 is prevented from rotating from the storage position B to the lowered in-use position A by the engagement of the fourth brackets 42 with the third brackets 40. The engagement of the fourth brackets 42 and the third brackets 40 further assist in supporting the platform 16 from the columns 12 in a vertical direction. Moreover, the second brackets 38 are configured and positioned so as to restrict the movement of the associated support elements 22 from between the platform 16 and the columns 12 when the platform 16 is in the storage position B.

Each column 12 is provided a substantially C-shaped cross-sectional configuration and defines a longitudinally-extending interior cavity 44 therein. The columns 12 are securely fixed to the rear 46 of a storage container 48 of a vehicle or trailer 50. The storage container 48 defines an interior space 52. Each support member 14 is telescopingly supported within the cavity 44 of the columns 12 for telescopingly linear movement in a direction as indicated and represented by directional arrow 54. Each support member 14 is supported within the associated column 12 by a plurality of rollers and other components, the particulars of which are disclosed in U.S. patent application Ser. No. 09/873,243, entitled HYDRAULIC PLATFORM LIFT INCORPORATING POSITIVE DISPLACEMENT VALVE, AND POSITIVE DISPLACEMENT FOR HYDRAULIC PLATFORM LIFT, the disclosure of which is incorporated in its entirety herein.

The forward section 18 of the platform 16 is pivotally coupled to the support members 14 for pivotal movement about an axis 56, while the rearward section 20 is pivotally coupled to the forward section 18 for pivotal movement about an axis 58. Although the illustrated example of the platform 16 includes a two-section configuration, including the forward section 18 and the rearward section 20, it should be noted that additional sections may also be utilized. The platform 16 further includes a ramp 60 pivotally coupled to the rearward section 20 for pivotal movement about an axis 62. As best illustrated in FIG. 2, the platform 16 is rotatable between the lowered in-use position A, an intermediate semi-raised position C, and the raised storage position B. The platform 16 is further repositionable between a lower storage position D (FIG. 4A), wherein the bracket 42 would engage the bracket 40, and an upper storage position E (FIG. 5), as discussed below.

In the illustrated example, each support element 22 includes a chain, however, other flexible apparatus suitable for such application may be utilized in place thereof. The first end 24 of each support element 22 is pivotally coupled to an associated support member 14 at a point located along the length of the support member 14 and on a surface facing inwardly with respect to the support columns 12. The second end 26 of each support element 22 is coupled to the rearward section 20 of the platform 16. The midpoint 34 of each of the support elements 22 is operably coupled to the second end 32 of an associated arm 28 by a device and pin assembly 64, thereby allowing free motion of the chain or support element 22 with respect to the arm 28. The second end 30 of the arm 28 is pivotally coupled to the platform 16 so as to pivot about the pivot axis 58. In operation, each arm 28 supports and guides each support element 22 in a manner that allows proper extension of the same and prevents entanglement of each support element 22 with other components of the lift gate assembly 10, as described below.

Each first or stop bracket 36 is rectangularly-shaped, extends outwardly from a side edge 66 of the forward section 18 of the platform 16 and is positioned along the length thereof so as to abut a second stop bracket 68 extending inwardly from an inner side edge of an associated support member 14. Specifically, the abutment of the first stop brackets 36 with the second stop brackets 68 prevents the platform 16 from over rotating with respect to the columns 12 and support members 14 when the platform 16 is raised from the in-use position A to the storage position B.

Each second bracket 38 is fixedly coupled with the rearward section 20 of the platform 16 and extends outwardly angularly upward from the platform 16. Each second bracket 38 is positioned so as to abut an associated arm 28 and prevent rotation of the arm 28 with respect to the rearward section 20 of the platform 16 when the platform 16 is raised from the in-use position A to the storage position B.

The third or hanger brackets 40 include a first pair of upwardly-angled hanger brackets 40, extending inwardly from the columns 12 and corresponding to a lower storage position D for the platform 16, and a second pair of hanger brackets 41 extending inwardly from the columns 12 and located at an upper storage position E. Each fourth bracket 42 is fixedly coupled to an associated arm 28 at a point located between the first end 30 and the second end 32 and extends rearwardly therefrom. Each fourth bracket 42 is L-shaped and includes a first end 70 fixed to the associated arm 28, an outwardly orthogonally-extending second end 72 adapted to engage the first and second set of hanger brackets 40, 41, and a stop portion 43 adapted to engage the hanger brackets 40, 41, thereby preventing over-rotation of the brackets 42.

In operation, the platform 16 is rotatably operable in a direction as indicated by directional arrow 74 (FIG. 2) between the lowered in-use position A and the raised storage position B. As the platform 14 is pivoted in the direction 74, each arm 28 pivots in a direction 76 until each arm 28 abuts and is prevented from further rotation by a respective second bracket 38. When in the completely retracted or storage position B, each second bracket 38 traps the corresponding support element 22 in the space 77 located between the side edge 66 of the platform 16 and the corresponding support column 12, thereby preventing the support element 22 from swinging about during operation of the vehicle 50 and damaging other components of the lift gate assembly 10 as well as any aesthetics of the lift gate assembly 10 or the vehicle 50.

Figure 5:
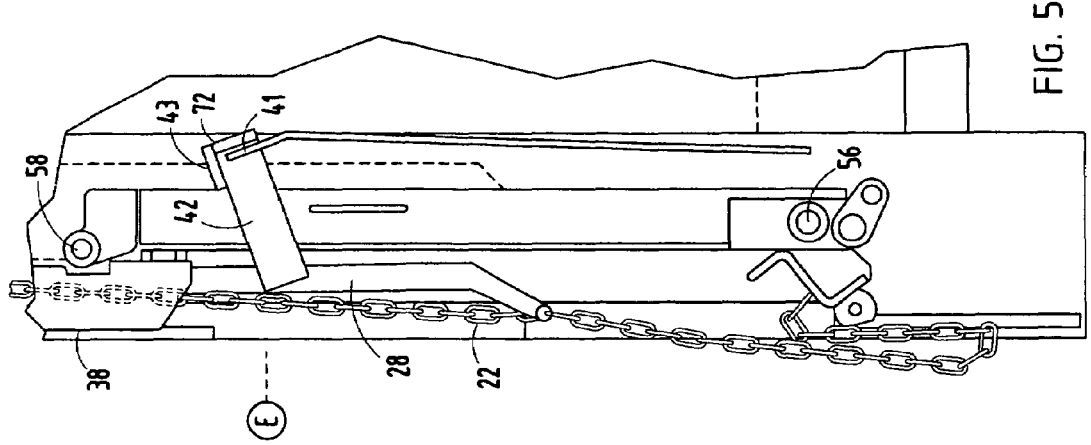
FIG. 5 is a side view of the lift gate assembly, wherein the platform is illustrated in an upper storage position.
Figure 4B:
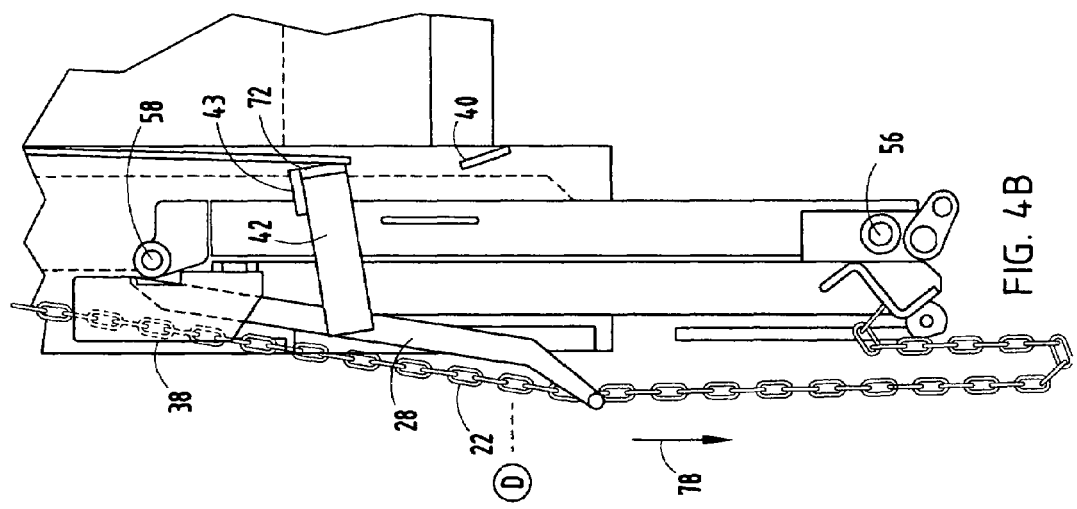
FIG. 4B is an enlarged side view of the retention assembly as illustrated in FIG. 4A.
Figure 4A:
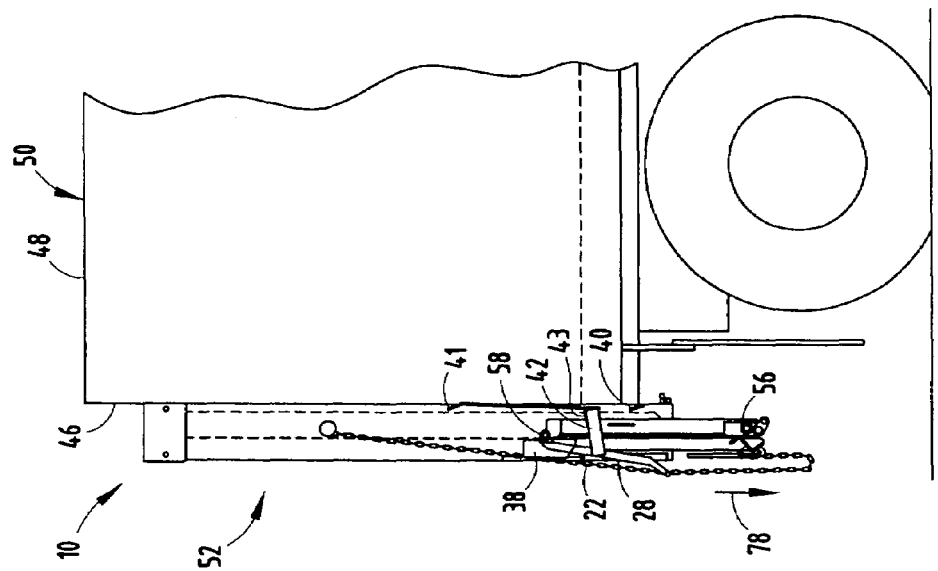
FIG. 4A is a side view of the lift gate assembly, wherein the lift gate assembly is shown in a slightly raised position with respect to a lower storage position of the platform.

The second end 32 of each arm 28 extends forwardly from the platform 16 when the platform 16 is in the raised storage position B. Each support member 14 is then telescopingly lowered with respect to the columns 12, thereby lowering the platform 16 in a direction 78 and engaging the second end 32 of each arm 28 with a corresponding first hanger bracket 40. As is best illustrated in FIG. 4A, the lower storage position D corresponding to the first hanger brackets 40 preferably positions the platform 16 below the opening 53, thereby allowing ingress and egress from the interior space 52 when the platform 16 is in the raised storage position B. In a similar manner, and as best illustrated in FIG. 5, the platform 16 may be stored in the upper storage position E by coupling the fourth brackets 42 with the second hanger brackets 41. The engagement of the fourth brackets 42 with either the first hanger brackets 40 or the second hanger brackets 41 effectively prevents rotation of the platform 16 from the raised storage position B to the lowered in-use position A, while simultaneously supporting the weight of the platform 16 from the columns 12 in a vertical direction.

The present inventive lift gate assembly provides support of an associated platform in a raised storage position, allows for storage of the platform at various heights with respect to an associated vehicle doors, and prevents support elements used to support the platform in a lowered in-use position from damaging other components of the lift gate assembly or the aesthetic appearance of the associated vehicle when in a raised storage position. The lift gate assembly is efficient in use and in storage, is safely operable by even unskilled workers, and is particularly well adapted for the intended use.

In the foregoing description, it will be readily appreciated by those skilled in the art that modifications may be made to the invention without departing from the concepts disclosed herein. Such modifications are to be considered as included in the following claims, unless these claims by their language expressly state otherwise. Accordingly, the scope of the present invention should be considered in terms of the following claims and is understood not to be limited to the details of structure and operation shown and described in the specification and drawings.

The invention claimed is:

1. A lift gate assembly, comprising:
    a pair of spaced apart columns;
    a pair of support members telescoping received within the pair of spaced apart columns;
    a platform having a first section operably coupled to the pair of support members, and a second section operably coupled to the first section;
    a support element having a first end operably coupled with one of the pair of support members, and a second end operably coupled with the platform, wherein the support element supports the platform when the platform is in an in-use position;
    an arm having a first end operably coupled to the platform and a second end operably coupled to the support element between the first and second ends of the support element;
    a first bracket fixed to the first section of the platform that restricts rotation of the platform with respect to at least one of the columns;
    a second bracket fixed to the second section of the platform that restricts the rotation of the arm with respect to the second section of the platform;
    at least one third bracket fixed to one of the columns; and
    a fourth bracket operably coupled to the arm and adapted to engage the third bracket to restrict rotation of the platform with respect to one of the columns and to support the platform from one of the columns in a vertical direction when the platform is in a storage position, thereby preventing the platform from moving in a vertical downward direction with respect to one of the columns.

2. The lift gate assembly of claim 1, further including:
a stop member fixed with respect to at least one of the support members and positioned so as to abut the first bracket to restrict the rotation of the platform with respect to at least one of the support members.

3. The lift gate assembly of claim 1, wherein the fourth bracket comprises an L-shape having a first section and a second section, and wherein the second section engages a forward-facing surface of the at least one third bracket.

4. The lift gate assembly of claim 1, wherein the at least one third bracket includes an upper bracket fixed to one of the columns at a first height, thereby supporting the platform at a first storage height.

5. The lift gate assembly of claim 4, wherein the upper bracket of the at least one third bracket is located with respect to the column such that the platform covers at least a portion of a rear opening of a vehicle to which the platform is coupled when the platform is in the storage position.

6. The lift gate assembly of claim 4, wherein the at least one third bracket includes a lower bracket fixed to one of the columns at a second height, thereby supporting the platform at a second storage height that is offset from the first storage height.

7. The lift gate assembly of claim 6, wherein the lower bracket of the at least one third bracket is located with respect to the column such that the platform is located below a rear opening of a vehicle to which the platform is coupled when the platform is in the storage position.

8. The lift gate assembly of claim 1, wherein the support members are hydraulically telescopingly actuated within the columns.

9. The lift gate assembly of claim 1, further including:
a ramp member operably coupled with the second section of the platform and that extends rearwardly of the second section of the platform when the platform is in an in-use position.

10. The lift gate assembly of claim 1, wherein the at least one support element comprises a chain.

11. The lift gate assembly of claim 1, wherein the second bracket is configured so as to restrict the movement of at least a portion of the support element from between one of the pair of columns and the platform when the platform is in the storage position.

12. A lift gate assembly, comprising:
a pair of spaced apart columns;
a pair of support members telescoping received within the pair of spaced apart columns;
a platform operably coupled to the pair of support members and operable between a lowered in-use position and a raised storage position;
a support element having a first end operably coupled with one of the pair of support members, and a second end operably coupled with the platform, wherein the support element supports the platform when in the in-use position;
an arm having a first end operably coupled to the platform and a second end operably coupled to the support element between the first and second ends of the support element;
at least one first bracket fixed to one of the columns; and
a second bracket operably coupled to the arm and adapted to engage the first bracket to restrict rotation of the platform with respect to one of the columns and to support the platform from one of the columns in a vertical direction when the platform is in the storage position, thereby preventing the platform from moving in a vertical downward direction with respect to one of the columns.

13. The lift gate assembly of claim 12, wherein the second bracket comprises an L-shape having a first section and a second section, and wherein the second section engages a forward-facing surface of the at least one first bracket.

14. The lift gate assembly of claim 12, wherein the at least one first bracket includes an upper bracket fixed to one of the columns at a first height, thereby supporting the platform at a first storage height.

15. The lift gate assembly of claim 14, wherein the upper bracket of the at least one first bracket is located with respect to the column such the platform would cover at least a portion of a rear opening of a vehicle to which the platform is coupled when the platform is in the storage position.

16. The lift gate assembly of claim 14, wherein the at least one first bracket includes a lower bracket fixed to one of the columns at a second height, thereby supporting the platform at a second storage height that is offset from the first storage height.

17. The lift gate assembly of claim 16, wherein the lower bracket of the at least one first bracket is located with respect to the column such that the platform is located below a rear opening of a vehicle to which the platform is coupled when the platform is in the storage position.

18. The lift gate assembly of claim 12, wherein the platform includes a first section operably coupled to the pair of support members, and a second section operably coupled to the first section.

19. The lift gate assembly of claim 12, further including:
a third bracket fixed to the platform and positioned to restrict rotation of the platform with respect to at least one of the columns.

20. The lift gate assembly of claim 19, further including:
a stop member fixed with respect to at least one of the support members and positioned so as to abut the third bracket, thereby restricting the rotation of the platform with respect to at least one of the support members.

21. The lift gate assembly of claim 12, wherein the support members are hydraulically telescopingly actuated within the columns.

22. The lift gate assembly of claim 12, wherein the at least one support element comprises a chain.

23. A lift gate assembly, comprising:
a pair of spaced apart columns;
a pair of support members telescoping received within the pair of spaced apart columns;
a platform operably coupled to the pair of support members and operable between a lowered in-use position and a raised storage position;
a support element having a first end operably coupled with one of the pair of support members, and a second end operably coupled with the platform, wherein the support element supports the platform when the platform is in the in-use position;
an arm having a first end operably coupled to the platform and a second end operably coupled to the support element between the first and second ends of the support element; and
a first bracket fixed to the platform, the first bracket restricts the rotation of the arm with respect to the platform and that restricts the movement of at least a portion of the support element from between one of the pair of columns and the platform when the platform is in the storage position by directly abutting the supporting element;
at least one second bracket fixed to one of the columns; and a third bracket operably coupled to the arm and that engages the second bracket and restricts rotation of the platform with respect to the columns and supports the platform from the columns in a vertical direction when the platform is in the storage position.

24. The lift gate assembly of claim 23, wherein the third bracket comprises an L-shape having a first section and a second section, and wherein the second section engages a forward-facing surface of the second bracket.

25. The lift gate assembly of claim 23, wherein the at least one second bracket includes an upper bracket fixed to one of the columns at a first height, thereby supporting the platform at a first storage height.

26. The lift gate assembly of claim 25, wherein the upper bracket of the at least one second bracket is located with respect to the column such that the platform would cover at least a portion of a rear opening of a vehicle to which the platform is attached when the platform is in the storage position.

27. The lift gate assembly of claim 25, wherein the at least one second bracket includes a lower bracket fixed to one of the columns at a second height, thereby supporting the platform at a second storage height that is offset from the first storage height.

28. The lift gate assembly of claim 27, wherein the lower bracket of the at least one second bracket is located with respect to the column such that the platform is located below a rear opening of a vehicle to which the platform is attached when the platform is in the storage position.

29. The lift gate assembly of claim 23, wherein the platform includes a first section operably coupled to the pair of support members, and a second section operably coupled to the first section.

30. The lift gate assembly of claim 23, further including:
a fourth bracket fixed to the platform and restricting rotation of the platform with respect to at least one of the columns.

31. The lift gate assembly of claim 30, further including:
a stop member fixed with respect to at least one of the support members and positioned so as to abut the fourth bracket restricting the rotation of the platform with respect to at least one of the support members.

32. The lift gate assembly of claim 23, wherein the support members are hydraulically telescopingly actuated within the columns.

33. The lift gate assembly of claim 23, wherein the at least one support element comprises a chain.

* * * * *